United States Patent [19]

Cummings

[11] Patent Number: 4,550,842
[45] Date of Patent: * Nov. 5, 1985

[54] FLEXIBLE PLASTIC STERILE CLOSURE SYSTEM FOR CONTAINERS

[75] Inventor: Robert Cummings, Richardson, Tex.

[73] Assignee: U.S. Clinical Products, Inc., Richardson, Tex.

[*] Notice: The portion of the term of this patent subsequent to May 12, 1998 has been disclaimed.

[21] Appl. No.: 453,215

[22] Filed: Dec. 27, 1982

Related U.S. Application Data

[63] Continuation of Ser. No. 294,331, Aug. 19, 1981, Pat. No. 4,390,104.

[51] Int. Cl.⁴ .................. B65D 41/32; B65D 51/20
[52] U.S. Cl. .................................. 215/232; 220/359; 604/408
[58] Field of Search ................ 215/232, 254, 230; 220/359; 604/408

[56] References Cited

U.S. PATENT DOCUMENTS 1,916,977 7/1933 Gutmann .......................... 215/232
4,209,126 6/1980 Elias .............................. 215/232 X
4,266,687 5/1981 Cummings ..................... 215/232 X Primary Examiner—Donald F. Norton
Attorney, Agent, or Firm—Richards, Harris, Medlock & Andrews

[57] ABSTRACT

A flexible plastic sealing cover has a container cover area and pull-tab area. In one embodiment, an upper layer of plastic film is substantially impervious to moisture and bacteria. An orientated plastic film layer is bonded to the upper layer with a layer of adhesive, such that the orientated plastic layer promotes tearing when the cover is removed with the pull-tab. An adhesive material is bonded to the layer of orientated plastic film for engaging and sealing the container top of a IV solution container. In removing the sealing cover from a container, telltale strips of the cover are left in engagement with the container to indicate the sterilized seal has been removed. In another embodiment, a single layer of plastic film substantially impervious to moisture and bacteria is bonded with a layer of adhesive material. Slits may be formed in the plastic layer to promote its separation to leave telltale sealing strips on the container upon removal of the cover.

18 Claims, 18 Drawing Figures

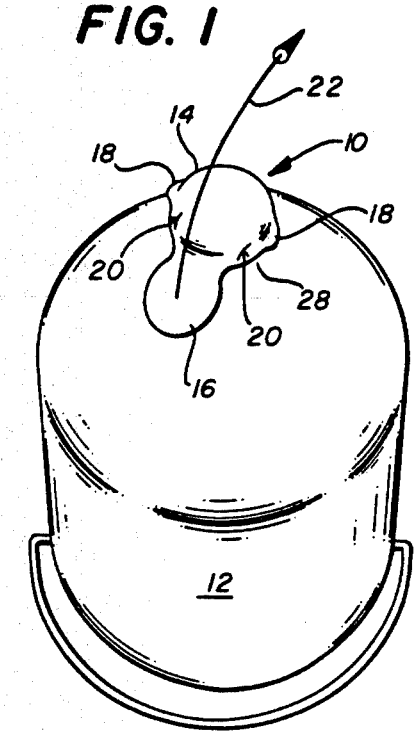
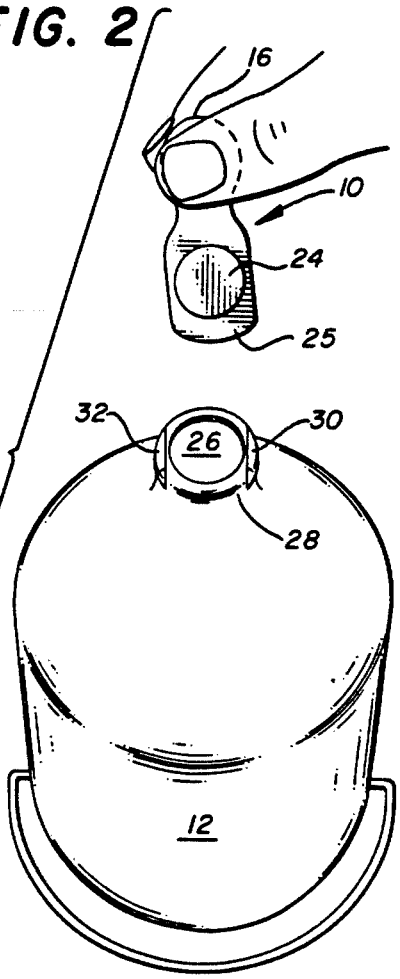
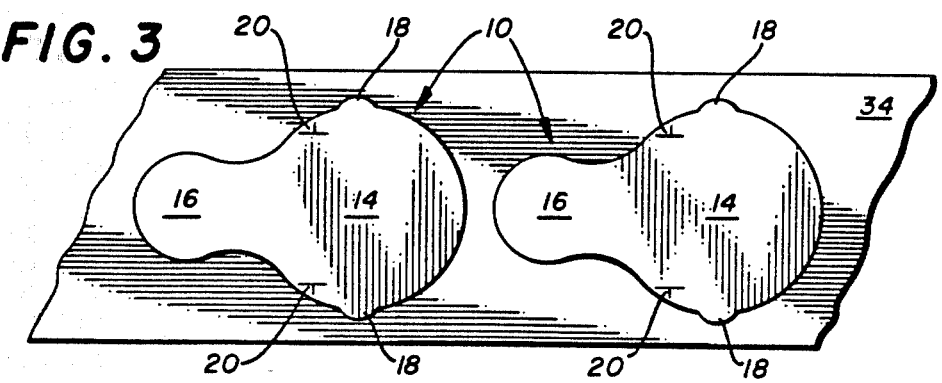

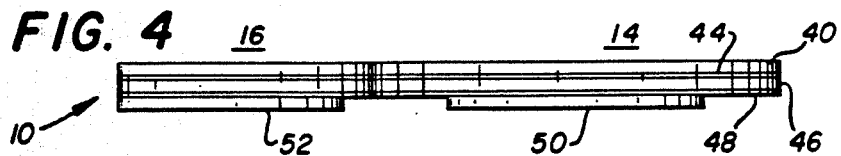
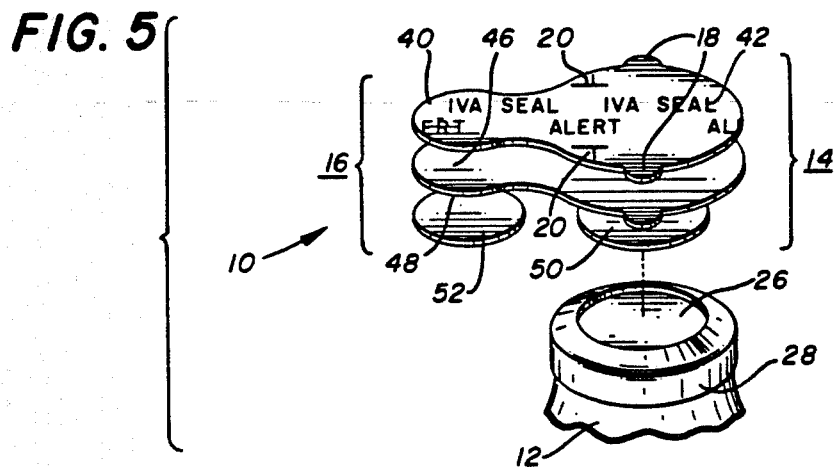
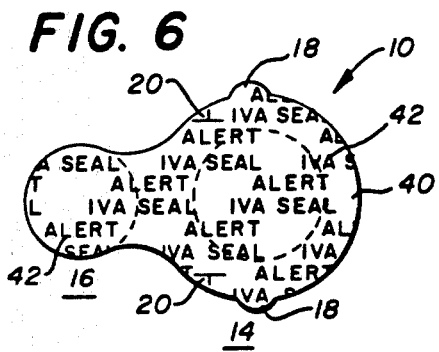
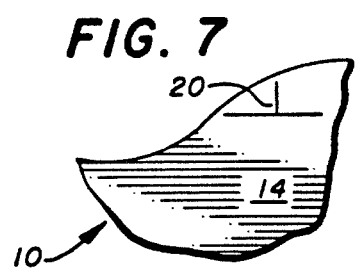
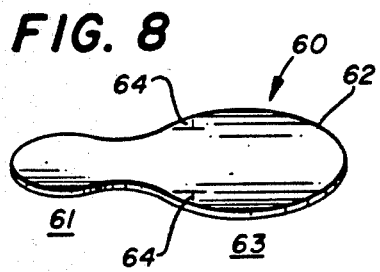
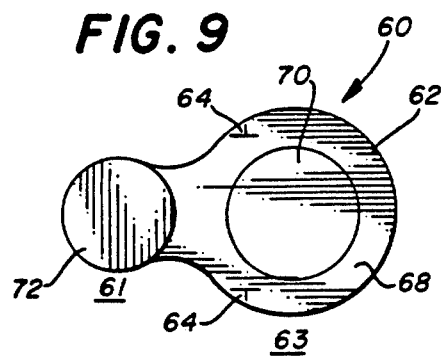

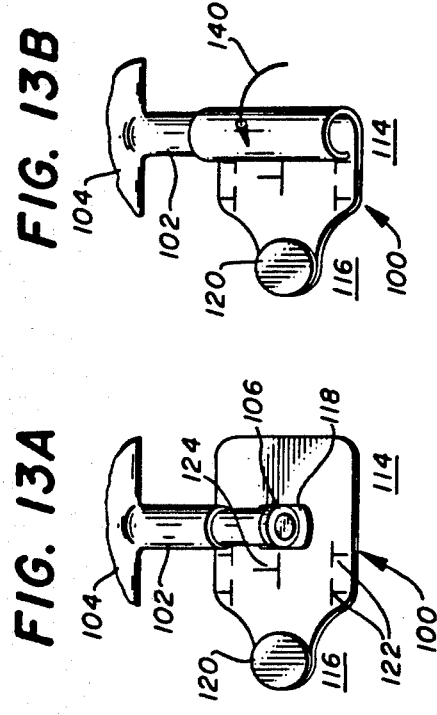
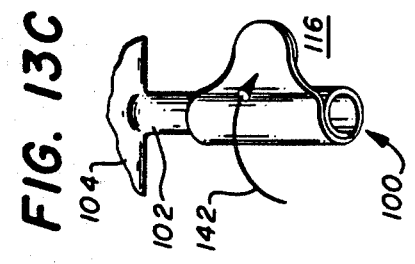
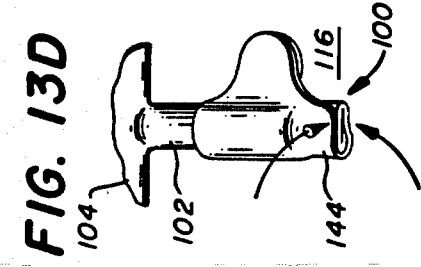
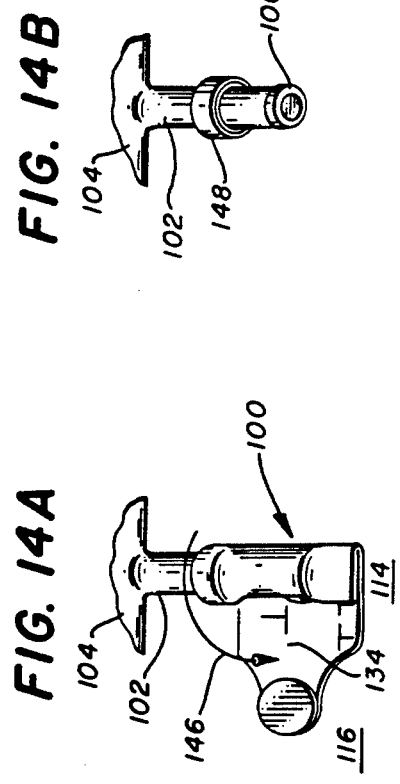
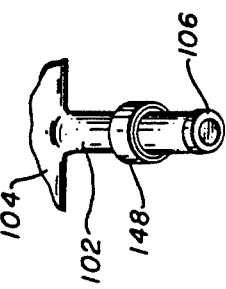

FLEXIBLE PLASTIC STERILE CLOSURE SYSTEM FOR CONTAINERS

This is a continuation of application Ser. No. 294,331 filed Aug. 19, 1981 now U.S. Pat. No. 4,390,104.

TECHNICAL FIELD

This invention relates to an article and method for resealing a sterilized intravenous pharmaceutical container, and more particularly to a sterile flexible plastic seal for resealing a pharmaceutical container and for leaving a telltale mark on the container when the replacement seal is removed.

BACKGROUND ART

Intravenous (IV) additive and injectable unit dose programs are administered in many hospitals as one method for introducing medications into a patient for a prescribed treatment. In prescribing an IV additive or an intramuscular medication unit dose treatment program, a doctor may order any one of a number of drugs or vitamins to be injected intramuscularly or added to the solution in a sterilized IV container and administered intravenously to a patient. The quantity of the drug or vitamin is also prescribed by the doctor to adjust the dosage of medication to the intravenous solution to the needs of each patient. In addition to the method of adding drugs and vitamins to an IV container for an IV additive program, some IV additive programs may be instituted by combining an IV additive solution in a "piggyback" arrangement of containers for certain specialized treatments requiring a combination of drugs.

In a hospital's IV additive program, the prescribed medication is added to an IV bottle or plastic IV bag under sterlized conditions by inserting a needle into the "target area" of a membrane closing the top of an IV solution bottle or a membrane covering the inlet port of a plastic IV bag. The IV solution bottle has a sterile seal covering the membrane area prior to the time of adding medication to the bottle. The IV container must be resealed under sterilized conditions to prevent airborne bacteria, such as *Pseudomonas aeruginosa,* from accumulating on the exposed surface of the IV container covering. In addition to maintaining a sterile surface of a container (the sterilization of the container covering), the resealing of the container alerts the hospital staff that the original contents have been altered by the Pharmacy. A hospital's nursing staff is trained not to administer the IV solution unless one of the members of the staff mixed the contents, or there is some means to alert the nursing staff that the contents have not been altered since they were prepared in the Pharmacy department. In the case of the plastic IV bag, the sealing cover protects the "plug" in the inlet port from becoming dislodged during transport, and the cover also alerts the Pharmacy that the contents have not been altered so the container and its contents may be revised.

The prior practice has been to utilize a plastic cap for resealing the IV containers. The plastic cap for the bottle container snaps over the top of the metal rim surrounding the rubber membrane to completely cover and seal the top of the solution bottle. The prior practice also uses a plastic cap or a heat shrink plastic wrap to reseal the plastic IV bag's inlet port. No provision is now made to remove the seal from an IV bag, since a separate outlet is used for administering the drugs to the patient.

In an effort to hold down hospital costs in reducing the allocation for expensive inventory space, the prior practice of most hospitals has attempted to maintain only one size plastic cap in inventory for IV bottles and another one for IV bags. Since the IV solution and piggyback containers are manufactured by different manufacturers, the tops are not of uniform diameter. The plastic caps do not provide the necessary sterilized seal in resealing the IV container if there is not a tight mechanical closure over the container top. As a result of the tight fit required between the plastic cap and a metal seal of a bottle, the nursing staff often faces a problem in attempting to separate the plastic cap from the metal rim. The nursing staff often must resort to using expensive surgical instruments or scissors, which can be damaged, to help them in prying off the plastic sealing cap. The difficulty of removing the plastic caps from IV containers has resulted in some hospitals issuing pliers to the nursing staff to remove the caps. Removal of plastic caps or resealing intravenous containers has resulted in the inefficient use of the services of skilled personnel, such as registered nurses, in attempting to remove container closures. More importantly, many of the prior art closures and methods for sealing IV solution bottles do not allow a nurse inspecting a container without a sealing cover to know where it was removed, or if it was previously resealed. In such a situation, rather than risk exposing the patient to a serious infection from harmful bacteria which may have accumulated on the top of such a container, the nurse must often reject the container which results in wasting the medication as well as a delay in administering the medication to a patient while additional medication is reordered from the Pharmacy department.

The present hospital practice does not normally include removing the plastic cap of heat shrink plastic wrap applied to the inlet port of an IV bag. Unlike the IV bottle, a separate outlet port is provided for connecting the container intravenously to the patient. However, the inability to reenter the inlet port with prior resealing techniques results in the loss of the entire container and its contents on those occasions when it is either desirable to change the dosage of the medication or the unit is not used and is returned to the Pharmacy department. As the medication in the container may be quite expensive, this represents a substantial loss to the hospitals.

On May 12, 1981, U.S. Pat. No. 4,266,687 issued to the inventor of the present invention for a sealing cover and method for resealing an intravenous container. The invention covered by that patent was an improvement over the prior practice of resealing IV bottles with molded plastic caps. The present invention offers even further improvements, including the improvement in applying a more flexible cover to such a container, an orientated plastic film to promote separation of the cover upon removal to leave a telltale mark on the rim of the container, and a top layer of a flexible plastic material having "t-shaped" slits to promote separation of the cover to form the telltale strips of plastic material. The flexible plastic cover may be made of a clear plastic material to give a cleaner and a more professional appearance when in place on a container. The flexibility of the cover enables one size cover to accommodate manufacturer's variations from the standard sized container top. In addition, the cover of the present invention represents an improvement in resealing plastic IV bags.

DISCLOSURE OF THE INVENTION

The apparatus and method of the present invention is an improvement over the above-described prior art apparatus and methods for sealing IV solution containers. It alerts the hospital staff that the content of an IV container has been altered in the Pharmacy department. In the present invention, an effective seal is constructed with plastic multilayered materials and in one embodiment of a single layer of flexible plastic material. The cover is a professional appearing sealing cover with flexibility for conforming to the contour of the various size and shaped container tops. The laminated construction of plastic sealing materials and bonding systems results in a flexible seal which may be packaged on a specially coated carrier liner, substantially reducing the inventory space required by the hospital for storing the present type of IV additive container closures.

In one embodiment of the present invention, the laminated structure of the improved sealing cover for use in resealing IV solution containers, particularly bottles, includes a bacteria and moisture proof upper layer such as polypropylene or polystyrene, a layer of specially orientated plastic film to promote tearing and separation of the material in one direction only, and a layer of adhesive material. An area of the adhesive coated surface for contacting the metal rim may be provided with a disk or a coating of ink, lacquer or other chemical material as a means for separating the adhesive from the rubber membrane of the container top. The area of adhesive material, normally an annular ring, is exposed upon removal of the cover from a carrier liner for placement over the top of the "target area" of the container top and brought into contact with the surrounding metal rim by slight pressure applied by the palm of the hand. A pull-tab may be joined to the generally circular shaped container closure for removing the closure from the specially coated carrier liner, aligning it with its center over the "target area" of the container top, and to facilitate removing the closure from the container to leave a neat appearing telltale plastic strip on the metal rim as verification that the seal was applied in Pharmacy. Slits may be provided in the cover to further promote the tearing of the cover on removal to leave a strip of material on the container. A tamper proof feature causes the seal to destruct upon removal to prevent a used non-sterile seal from being reapplied on that container or reused on another container top, as well as to reduce the chances of someone inadvertently resealing a container so it would appear to be still in a sterilized condition.

In addition to the above stated advantages, the improved flexible plastic seal of the present invention may also have its upper plastic surface printed to identify the enclosure with some code, e.g. a requirement for refrigeration, as well as to facilitate the detection of the clear plastic telltale strips remaining on an opened IV container.

In another embodiment of the present invention, the laminated structure of the improved sealing cover for use in resealing a plastic IV solution bag includes a bacteria and moisture proof upper layer such as polypropylene, polystyrene or another plastic or other type of material impervious to moisture and bacteria, a layer of specially orientated plastic film to promote tearing and separation of the material in one direction only, and a layer of adhesive material. An area of the adhesive coated surface for adhering to the inlet port may be provided with one or more disk or a coating of ink, lacquer or other material for keeping the adhesive from the rubber stopper closing the inlet port. The area of adhesive material, generally rectangular in shape, is exposed upon removal of the cover from a carrier liner for wrapping it around the neck of the inlet port. The edge of the cover extending beyond the rubber stopper is closed upon itself by pinching to seal the inlet port. A pull tab may be included to facilitate placement and removal of the cover. Slits may be provided in the cover to further promote leaving a strip of material on the container upon removal.

In yet another embodiment of the present invention, an improved sealing cover for use in resealing an IV solution container includes a single layer of plastic film and a layer of adhesive material. The plastic material may be a polypropylene, polystyrene or other plastic film or a specially orientated plastic film to promote tearing and separation of the material in one direction only. The single layer sealing cover may be formed for use in closing an IV solution bottle or a plastic bag as noted hereinabove. Further, the plastic material may be color coded or clear with printing to identify the type additive or to indicate specially handling, e.g. a requirement for refrigeration, for the container.

BRIEF DESCRIPTION OF DRAWINGS

For a more complete understanding of the present invention and the advantages and features thereof, reference is now made to the accompanying Detailed Description taken in conjunction with the following figures in which:

FIG. 1 is a perspective view of an IV solution container resealed with a flexible seal of the present invention;

FIG. 2 is a perspective view of the IV solution container of FIG. 1, illustrating the strips of clear plastic material adhering to two sides of the metal rim upon removal of the sealing cover;

FIG. 3 is a top view of two sealing covers of the present invention packaged upon a strip of specially coated carrier liner;

FIG. 4 is an enlarged side view, illustrating the lamination of plastic layers and bonding systems of the preferred embodiment of the present invention;

FIG. 5 is an enlarged exploded view of the laminated structure of the sealing cover of the present invention positioned above an IV solution container top;

FIG. 6 is a top view of the preferred embodiment of the present invention;

FIG. 7 is a partially cutaway enlarged view of the slit formed in the sealing cover;

FIG. 8 is an enlarged perspective view of a single layer plastic sealing cover of the present invention;

FIG. 9 is a bottom view of the single layer plastic sealing cover of FIG. 8;

FIGS. 13A–D illustrate the steps in resealing the inlet port of a plastic IV container; and FIGS. 14A-B illustrate the steps in removing the sealing cover of the present invention from the inlet port of a plastic IV container.

DETAILED DESCRIPTION

Figure 10:
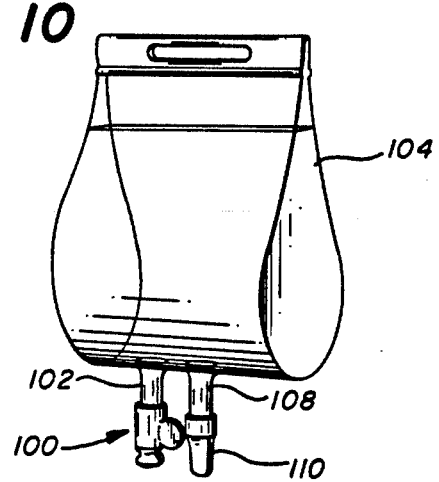
FIG. 10 is a perspective view of a plastic IV solution container closed with an alternate embodiment of a sealing cover of the present invention.

FIG. 1 illustrates the sealing cover of the present invention, generally identified by the reference numeral 10. The sealing cover 10 is shown securely in place and conforming to the top of an IV solution container 12. The sealing cover 10 includes a generally circular cover area 14 joined to a pull-tab section 16 for affixing and removing the cover 10. The cover area 14 may also include protrusions 18 extending from opposite edges of the cover area 14 for promoting the secure attachment of the cover 10 to the container 12. Of course, the sealing covers 10 may also be secured to the container without the addition of protrusions 18, e.g. see FIG. 8. The cover 10 has separation slits 20 formed on opposite sides of the cover area 14 to promote the separation of the cover 10 upon its removal from the container 12 to leave telltale plastic strips of material along two sides of the container top. The direction in which the pull-tab 16 is pulled to remove the cover 10 is generally indicated by the arrow 22.

FIG. 2 illustrates the IV solution container 12 and sealing cover 10 of FIG. 1 after the removal of the cover 10. FIG. 2 also illustrates the nonadhesive region 24 within an adhesive annular ring 25 on the side of the cover 10 next to the "target area" 26 of the container top 28. The telltale strips 30 and 32 remain in place on the container top 28 and indicate that the sterilized seal has been broken. Upon removal of the sealing cover 10, the IV solution container 12 is ready for a member of the nursing staff of a hospital to insert a needle through the rubber membrane "target area" 26 to begin the administration of an IV additive solution in the container 12 to the patient.

FIG. 3 is a top view of two sealing covers 10 packaged upon a strip of carrier liner 34. The liner 34 has been coated with a special material to allow the adhesive annular ring 25 to adhere to it for packaging purposes, yet allow the adhesive ring 25 to be separated from the liner 34 without causing the cover 10 to separate. The sealing covers 10 may be packed upon a continuous strip of carrier liner 34 and rolled into a spiral ring for use in a flat cardboard container for dispensing individual sterilized sealing covers 10. The improved sealing covers 10 of the present invention may be packaged in bulk on the carrier liners 34, requiring approximately only 10% of the storage space previously required for the molded plastic resealing caps of the prior art.

FIGS. 4 and 5 illustrate the laminated structure of the preferred embodiment of the sealing cover 10. The bacteria and moisture impermeable upper layer 40 of the cover 10 may be formed from a polypropylene, polystyrene, or other plastic material. The upper layer 40 may be imprinted with a message 42 which could provide information concerning the IV additive solution as well as promote the visibility of the clear plastic telltale strips 30, 32 left on the container top 28 upon separation of the construction of the cover 10. A layer of adhesive material 44 is applied to one surface of the upper layer 40 which is to be mated with a layer of specially orientated plastic film 46. The orientated plastic layer 46 is mated to the upper layer 40 so that the greater tensile strength of the film is in the direction normal to the direction of the pull-tab 16 in removing the cover 10 (FIG. 1, arrow 22) to promote a straight line tear. The special orientated polyethylene film 46 has the desired characteristics to provide a flexible sterile seal, yet it promotes separation of the cover 10 when pulled in one direction when removed from container 12. The flexibility provided in the upper layer 40 and orientated layer 46 allows for a more standard sized sealing cover 10 to be provided with an enlarged cover area 14 which still remains flexible enough to conform to the shape of large and small container tops 28.

A second layer of adhesive material 48 is applied to the surface of the layer 46 to engage the container top 28. In order to prevent the adhesive material 48 from contacting the "target area" of a membrane 26 of the container top 28, a disk 50 is bonded to the adhesive layer 48. The disk 50 may be coated with a release material to promote its separation from the carrier liner 34. Similarly, a disk 52 is bonded to the adhesive 48 in the pull-tab region 16 to keep the adhesive material 48 covered. The disks 50 and 52 may be made from a polystyrene or other material, and the disk 50 may be from a material, e.g., polystyrene, to leave telltale puncture marks to indicate if the contents of the IV container have been altered since it left the Pharmacy department. In another embodiment of the sealing cover 10, a chemical sealant, such as an ink or lacquer material, may be applied to the central region of the adhesive layer 48 to seal the adhesive 48 from contacting the rubber membrane 26.

FIG. 6 illustrates a top view of a sealing cover 10 with two "T shaped" separation slits 20 formed in the upper plastic layer 40 to further promote the separation of materials upon removal of the cover 10 from a container top 28 to leave the telltale strips 30 and 32. As illustrated in the enlarged partially cutaway view of a cover 10 in FIG. 7, the separation slits 20 are formed in the cover region 14 such that the edges of the slits 20 do not extend to the edge of the cover 10. The slit 20 is set back from the edge of the cover 10 to reduce the likelihood of tearing the sealing cover 10 when removing it from the carrier 34.

In use, the sealing cover 10 is manufactured under clean conditions and attached to a chemically treated carrier liner 34 to retain the sterility of the cover 10 during storage prior to its use. The strip of carrier material 34 may be rolled and placed in a dispensing carton (not shown), and the cartons may be packaged in plastic bags. The bags containing the package seals 10 are sterilized by using ethylene oxide gas to meet the current sterility standard of the U.S. Pharmacopoeia (U.S.P. No. 19). Of course, the strip of carrier liner 34 with attached sealing covers 10 may be packaged in any suitable configuration desired for ease in dispensing the sealing covers 10, and it may be sterilized by any means meeting the current sterility standards of the U.S. Pharmacopoeia.

In a normal hospital IV additive program, the original sealing cover for the IV solution container 12 (or intramuscular injectable vials) installed by the manufacturer is removed by a nurse or other hospital personnel under procedures prescribed for maintaining sterile conditions. The prescribed medication is then added to the IV solution in container 12 under a sterile hood or similar hospital condition for maintaining a sterile work environment. The medication may be added to a full bottle or to a piggyback bottle, or a diluent may be added to a bottle to reconstitute a powdered drug.

Medication is introduced into the container 12 by puncturing the rubber membrane 26 with a transfer system, such as a syringe containing a controlled quantity of the prescribed medication or an IV transfer needle or IV additive vials on other medication transfer devices. Upon release of the medication into solution the syringe is withdrawn. A sterile sealing cover 10 is then withdrawn from its dispenser and removed from the special carrier liner 34 by means of the pull-tab 16. The polystyrene disk 50 or other area of the cover 10 aligned with the "target area" rubber membrane 26 remains in a sterile condition until removal from the carrier liner 34. A disk 50 is positioned over the rubber membrane 26, and the annular ring 25 of adhesive material 48 is brought into engagement with the container top 28 by slight pressure from the palm of the hand. In order to ensure a complete fit, the protrusions 18 may be pressed against the metal container top 28. The pull-tab region 16 may also be pressed downward to insure the adhesive material 48 in the annular ring 25 adjacent the pull-tab 16 is brought into engagement with the container top 28. The top of the sealing cover 10 may include an imprinted code for identification purposes, such identification as the identity of the drug added to the IV solution, or any other information which may be desired by the user.

The sterile seal of the resealed IV container 12 is not broken until the nursing staff is ready to administer the IV solution to the patient. The sealing cover 10 may be removed by hand, without using any instruments, such as pliers or scissors, which are often required now in removing plastic resealing caps. The pull-tab 16 of a sealing cover 10 is pulled upwards in the direction generally indicated by the arrow 22 of FIG. 1 in order to properly remove the cover 10 from the container 12. The orientated plastic film layer 46 is stronger in the direction normal to the arrow 22 and weaker in the direction parallel to the arrow 22 so that separation of the cover 10 is promoted. The slits 20 facilitate the beginning of the separation of the cover 10 to leave the two telltale sections 30 and 32 still attached to the container top 28. The telltale material left on the metal rim alerts the hospital staff that the sterile seal has been removed. A second check that the integrity of the IV additive solution has not been tampered with is to check the polystyrene disk 50 for any puncture marks to indicate a drug may have been added after the container left the Pharmacy department. Once the sealing cover 10 has been removed, a nurse may insert a needle through the rubber membrane 26 and complete the connection through plastic tubing to an intravenous catheter inserted into the vein of the patient.

FIG. 8 illustrates another embodiment of the present invention, a sealing cover 60 made from a single layer of plastic film 62. The sealing cover 60 includes a generally circular cover area 63 joined to a pull-tab section 61. The single layer of plastic film 62 may be formed from a sheet of polypropylene or polystyrene material. The plastic film 62 may be made from a color coated plastic film for use by a hospital in handling the IV solution container, such as to designate the type of additive in the IV solution or special handling requirements, e.g., whether or not the IV solution container needs to be refrigerated. In addition, the plastic film 62 may be formed from a layer of specially orientated plastic film, such as the specially orientated plastic film 46 described hereinabove. A pair of generally T-shaped slits 64 may be provided near the edges of the sealing area of the cover 62 to promote tearing and a separation of the cover 60, similar to the slits 20 described hereinabove.

FIG. 9 is a bottom view of the sealing cover 60 illustrated in FIG. 8. The bottom surface of the sealing cover 60 includes an adhesive area 68 for providing sealing engagement with the IV solution container. An adhesive free area 70 of the bottom of the sealing cover 60 is maintained for the top of the IV solution bottle or plastic bag which should be kept separate from the adhesive surface 68. The adhesive free area 70 may be formed on the bottom surface of sealing cover 60 by covering the surface with a plastic disk, such as disk 50 illustrated in FIGS. 4 and 5 and described hereinabove. Of course, the adhesive free area 70 may also be formed by other means, such as by applying a layer of chemical sealant, such as an ink or lacquer material to seal the adhesive area 68 from contact with the rubber membrane covering the IV solution container. The pull-tab region 64 of the sealing cover 60 may also include a plastic disk 72 for forming a more rigid pull-tab and for sealing off the adhesive material which may apply to the pull-tab region of the tab. As noted for the adhesive free region 70, the bottom surface of the pull-tab section 61 also may be coated with a chemical sealant to seal off the adhesive area 68 from contact with the pull-tab region 61.

FIG. 10 illustrates yet another embodiment of the present invention, a sealing cover 100 wrapped about the inlet port 102 of a plastic IV bag 104. The inlet port 102 has a rubber stopper 106, as shown in FIG. 13A, through which an IV additive is introduced into the solution in the IV bag 104. A discharge port 108 through which the solution is administered to the patient is closed by a sterile cover 110. The sealing cover 100 serves several functions: (1) it keeps the IV bag 104 from being double dosed once the Pharmacy department has injected the medication, (2) it keeps the stopper 106 from being dislodged in transit and keeps bacteria from entering the punctured stopper 106, and (3) it allows the Pharmacy to salvage expensive drugs if the IV bag 104 is returned.

Figure 11:
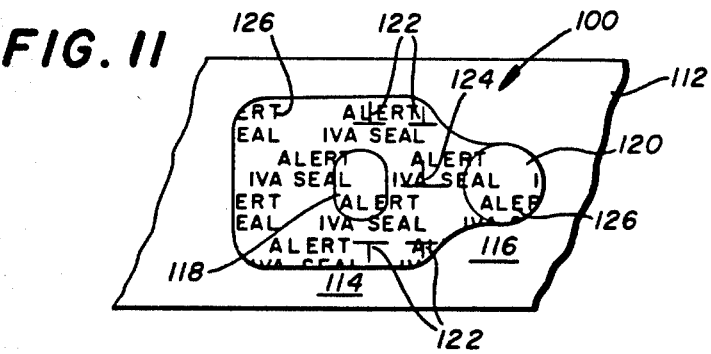
FIG. 11 is a top view of the sealing cover illustrated in FIG. 9 positioned on a strip of specially coated carrier liner.

FIG. 11 illustrates the sealing cover 100 for the plastic IV bag 104 as it might be packaged on a section of specially coated carrier paper 112. The sealing cover 100 includes a sealing area 114 and a pull-tab area 116. The sealing area 114 includes an inlet stopper protective tab 118 shown through the clear plastic film and a pull-tab disk 120 in the area of the pull-tab section 116. More than one tab 118 may be used to protect the stopper 106 and facility emplacement of the cover 100 on the port 102. Generally T-shaped slits 122 are formed along the edge of the sealing area 114. The slits 122 serve to promote the tearing and separation of the sealing cover 100 in a similar manner to the slits 20 in sealing cover 10 and the slits 64 in sealing cover 60 described hereinabove. An additional T-shaped slit 124 is provided in the central area of the sealing area 114 to further promote the destruction of the sealing cover 100 upon its removal from the inlet port 102 to prevent its further use. Identifying information 126 may be printed upon the sealing cover 100 to provide information to the hospital staff.

Figure 12:
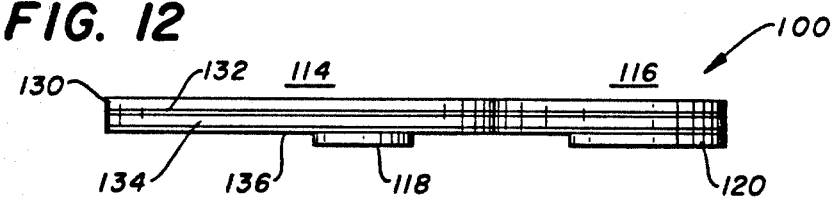
FIG. 12 is an enlarged side view of the sealing cover shown in FIG. 11.

FIG. 12 is an enlarged side view illustrating the lamination of plastic layers and bonding systems of the preferred embodiment of the present invention. Of course, the sealing cover 100 may also be constructed from a single layer of plastic film, such as the sealing cover 60 illustrated in FIGS. 8 and 9 and described hereinabove. A bacteria and moisture proof upper layer 130 of the cover 100 may be formed from a polypropylene or polystyrene material. The upper layer 130 may be imprinted with a message 126 which could provide information concerning the IV additive solution as well as visibility of the clear plastic telltale strips left upon the neck of the inlet port 102. A layer of adhesive material 132 is applied to one surface of the upper layer 130 which is to be mated with a layer of specially orientated plastic film 134. The orientated plastic layer 134 is mated onto the upper layer 130 so that the greater strength of the film is in the direction parallel to the direction the pull-tab 116 is pulled in removing the cover 100 to promote a straight line tear. Specially orientated polyethylene film 134 has the desired characteristics to provide a flexible sterile seal, yet it promotes the separation of cover 100 when pulled in one direction when removed from the plastic IV bag 104. A second layer of adhesive material 136 is applied to the surface of the plastic film 134 to engage the neck of the inlet port 102 of the IV bag 104. In order to prevent the adhesive material 136 from contacting the "target area" of a rubber stopper 106, a "target area" disk 118 is bonded to the adhesive layer 136. The disk 118 may be made of polystyrene, polypropylene or other plastic material and coated with a release material to promote separation from the carrier liner 112. Similarly, a disk 120 is bonded to the adhesive 136 in the pull-tab region 116 to keep the adhesive material 136 covered. In another embodiment of the sealing cover 100, a chemical sealant, such as an ink or lacquer material, may be applied to the adhesive layer 136 to provide the "target area" disk 118 and pull-tab 120.

FIGS. 13A-D illustrate the placement of a sealing cover 100 around the inlet port 102 of the plastic IV bag 104. FIG. 13A illustrates sealing cover 100 removed from its carrier liner 112 and aligned with the target area disk 118 adjacent the rubber stopper 106 of the inlet port 102. As illustrated in FIG. 13B, the edge of the sealing area 114 distal from the pull-tab region 116 is wrapped tightly about the stem of the inlet port 102 in the direction indicated by the arrow 140. As illustrated in FIG. 13C, pull-tab section 116 is tightly wrapped around the stem of inlet port 102 in the direction indicated by the arrow 142, wrapping the seal 100 about itself to surround the neck of the inlet port 102. As illustrated in FIG. 13D, the final step in sealing the inlet port 102 is to close the sealing cover 100 upon itself by pinching the area 144 of the sealing area 114 extending beyond the end of the rubber stopper 106.

FIGS. 14A-B illustrates the steps in removing the sealing cover 100 from the inlet port 102. Pull-tab 116 is pulled in the direction indicated by the arrow 146 to initiate tearing of the sealing area 114, promoted by the specially orientated layer of plastic film 134 and the slits 122. As illustrated in FIG. 14B, when the seal 100 is removed a narrow band of plastic material 148 is left around the neck of the inlet port 102 to indicate that a seal applied in the Pharmacy department of the hospital has been removed.

Although the preferred embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the spirit of the invention. In addition to its use as a sterile reclosure seal, the sealing cover 10 may also be used on a container top as a security seal. Whether or not the seal cover 10 serves to maintain the sterility of a container, it may also serve as a means for indicating that the container seal has been broken by use of the telltale strips 30 and 32 when the cover 10 is removed.

I claim:

1. A flexible plastic multilayered cover for resealing an intravenous solution container, comprising:
   a first layer of flexible plastic material forming an upper surface of the cover, said first layer being formed from a material substantially impermeable to moisture and bacteria;
   a second layer of flexible plastic material bonded to said first layer of plastic material, said second layer having an orientated plastic film with a tensile strength in the direction normal to the direction the cover is pulled in removing it from a container greater than the tensile strength parallel to the direction of removal;
   an area of adhesive material bonded to the surface of said second layer for adhering to the top of an IV solution container to reseal the IV solution container; and
   an adhesive free region of said second layer for aligning with the port of the container resealed by the cover, whereby the sterility of the covered portion of the IV solution container is retained by placing the sealing cover on the portion of the container top to be resealed and said second layer of material promotes separation of the cover upon its removal to leave a telltale mark that the sterile closure has been broken while fully exposing the port of the container.

2. The flexible plastic multilayered cover of claim 1 and further comprising:
   a plastic disk attached to said adhesive layer for forming said adhesive free region to separate said adhesive layer from the covered surface of the container top.

3. The flexible plastic multilayered cover of claim 1 and further comprising a plurality of slits formed in said sealing cover to promote the separation of the cover for forming telltale strips of material indicating the sterile seal has been broken.

4. The flexible plastic multilayered cover of claim 1, and further comprising a chemical adhesive sealant applied to the central area of the surface of adhesive material to form said adhesive free region to prevent the adhesive from contacting the container top.

5. The flexible plastic multilayered cover of claim 4, wherein said chemical adhesive sealant is an ink solution.

6. The flexible plastic multilayered cover of claim 5, wherein said upper layer is polystyrene.

7. The flexible plastic multilayered cover of claim 1, wherein said upper layer is polypropylene.

8. The flexible plastic multilayered cover of claim 1, wherein said second layer is polyethylene.

9. The flexible plastic multilayered cover of claim 1, and further comprising means for packaging said cover upon a strip of carrier material, said adhesive material loosely bonding the cover to said carrier material while allowing removal of the cover without separation of the cover.

10. The flexible plastic multilayered cover of claim 1, wherein said first and second layer of flexible plastic material is substantially transparent.

11. The flexible plastic multilayered cover of claim 10, and further comprising:
   means providing a visually recognized mark to the cover whereby the mark provides information as to the contents of the intravenous solution container.

12. The flexible plastic multilayered cover of claim 11, wherein said means providing a visually recognized mark to the cover consists of a printed message applied to said second layer of flexible plastic material.

13. The flexible plastic multilayered cover of claim 11, wherein the mark provided by the means providing a visually recognized mark is a color code in said second layer of flexible plastic material, whereby information is provided relating to the contents of the intravenous solution container.

14. The flexible plastic multilayered cover of claim 1, wherein a disk is attached to said adhesive layer, said disk being formed from a material which leaves a telltale opening from a needle puncturing said disk, whereby said disk indicates if the contents of the intravenous container have been altered after the container is resealed.

15. A flexible plastic cover for resealing an intravenous solution container, comprising:
   a flexible plastic material forming a layer substantially impervious to moisture and bacteria;
   an area of adhesive material bonded to a surface of said layer of flexible plastic material for adhering to the port of the intravenous solution container to reseal the intravenous solution container;
   an adhesive-free region of said layer of flexible plastic material formed within the area of adhesive material for alignment with the port of the intravenous container to be resealed; and
   means forming a telltale strip of said layer of flexible plastic material on the intravenous container upon removal of the sealing cover, whereby the cover is destroyed to prevent its reuse and the port of the intravenous solution container is fully exposed to facilitate use and yet the container is identified as having its sterile seal broken.

16. The flexible plastic cover of claim 15, wherein said means forming a telltale strip of said layer of flexible plastic material on the container consists of slits formed within said layer of plastic material to promote its tearing and separation upon removal from the container.

17. The flexible plastic cover of claim 15, wherein said means forming a telltale strip consists of said plastic material being formed from an orientated plastic film with a tensile strength in the direction normal to the direction the cover is pulled in removing it from a container greater than the tensile strength parallel to the direction of removal.

18. The flexible plastic cover of claim 15, wherein said adhesive-free region is formed by attaching a plastic disk to said adhesive layer.

* * * * *

UNITED STATES PATENT AND TRADEMARK OFFICE
CERTIFICATE OF CORRECTION

PATENT NO. : 4,550,842
DATED : November 5, 1985
INVENTOR(S) : Robert Cummings

It is certified that error appears in the above-identified patent and that said Letters Patent is hereby corrected as shown below:

Column 3, line 17, change "clossures" to --closures--.

Column 8, line 19, change "64" to --61--.

Signed and Sealed this

Fourteenth Day of January 1986

[SEAL]

Attest:

DONALD J. QUIGG

Attesting Officer

Commissioner of Patents and Trademarks